United States Patent [19]
Kubes et al.

[11] Patent Number: 5,877,695
[45] Date of Patent: Mar. 2, 1999

[54] VISUAL ALARM FOR A COMMUNICATION MODULE

[75] Inventors: Joseph Kubes, Raleigh; John Joseph Hayes, Jr., Wake Forest, both of N.C.

[73] Assignee: Ericsson, Inc., Research Triangle Park, N.C.

[21] Appl. No.: 946,491

[22] Filed: Oct. 7, 1997

[51] Int. Cl.$^6$ ........................... G08B 5/00
[52] U.S. Cl. ............... 340/815.4; 340/693; 340/815.53; 340/825.81; 313/506; 345/76; 455/90; 455/566
[58] Field of Search ............ 340/815.4, 815.53, 340/825.79, 825.81, 691, 693; 341/20, 22, 31; 345/76, 80, 82, 84, 87, 105–107, 204–206, 211; 455/90, 95, 128, 145, 347, 351, 566, 575; 362/84; 313/506, 505, 511

[56] References Cited

U.S. PATENT DOCUMENTS

| | | | |
|---|---|---|---|
| 4,608,457 | 8/1986 | Fowler et al. | 179/2 A |
| 4,613,793 | 9/1986 | Panicker et al. | 315/169.3 |
| 4,758,830 | 7/1988 | Levien et al. | 340/712 |
| 4,996,523 | 2/1991 | Bell et al. | 345/147 |
| 5,149,923 | 9/1992 | Demeo | 200/5 A |
| 5,189,405 | 2/1993 | Yamashita et al. | 313/512 |
| 5,384,459 | 1/1995 | Patino et al. | 250/229 |
| 5,397,867 | 3/1995 | Demeo | 200/5 A |
| 5,405,710 | 4/1995 | Dodabalapur et al. | 428/690 |
| 5,646,649 | 7/1997 | Iwata et al. | 345/173 |
| 5,703,436 | 12/1997 | Forrest et al. | 313/506 |

FOREIGN PATENT DOCUMENTS

WO 94/14180  6/1994  WIPO .

OTHER PUBLICATIONS

David Lieberman, *Plastic Displays*, OEM Magazine, Apr. 1996, pp. 76–77.

*Primary Examiner*—Daniel J. Wu
*Attorney, Agent, or Firm*—Jenkens & Gilchrist, P.C.

[57] ABSTRACT

An organic electroluminescent material is sealed within the outer housing of a portable radio telephone along with the control grids to cause the material to luminesce in a pixilated pattern. The pixels are controlled to generate a visual alarm which flashes a warning to a user as either a message or a flashing color of the housing or image. The visual alarm may be combined with audible and vibratory alarms within the mobile telephone.

11 Claims, 5 Drawing Sheets

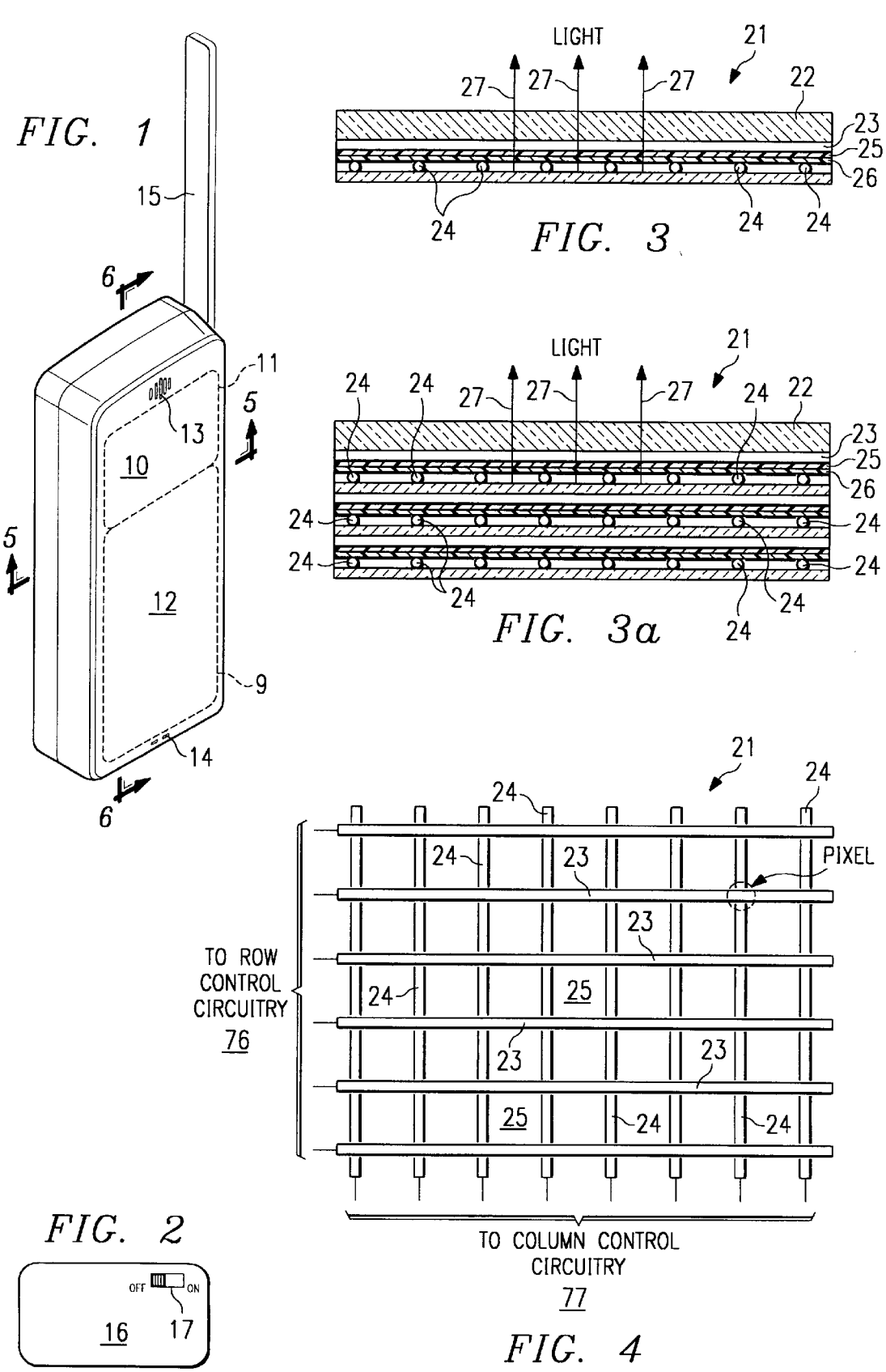

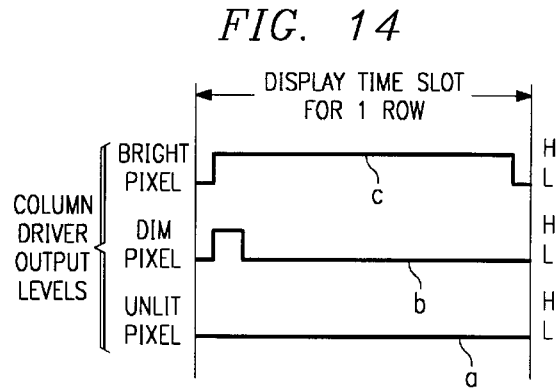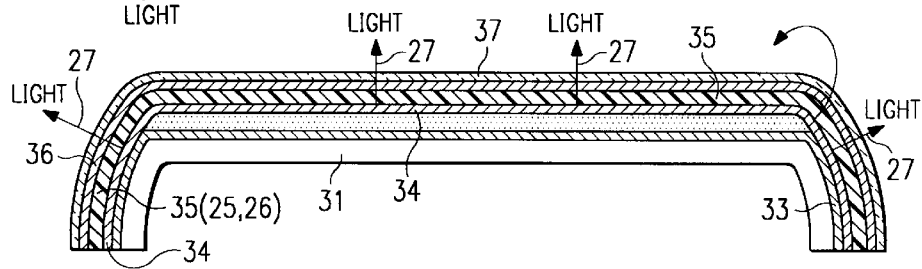

- (1) TURN OFF ALL ROWS
- (2) DISABLE CLK
- (3) LOAD DOWN CNT-COLUMN 1 FOR ROW m
- (4) LOAD DOWN CNT-COLUMN 2 FOR ROW m
- (n+2) LOAD DOWN CNT-COLUMN N FOR ROW m
- (n+3) ENABLE ROW m, START CK
- (n+4) DELAY
- (n+5) INCREMENT m

VISUAL ALARM FOR A COMMUNICATION MODULE

This application is related to U.S. application Ser. No. 08/747,846 filed Nov. 13, 1996 in the name of Kubes et al. and entitled "Electroluminescent Backlit Devices" and U.S. patent application Ser. No. 08/946,270, filed on even date herewith in the name of Kubes and entitled "Communication Module Having Selectively Programmable Exterior Surface" (attorney's Docket No. 27951/00197); both of which are hereby incorporated by reference herein.

BACKGROUND OF THE INVENTION

1. Field of the Invention

The present invention relates to communication devices, such as mobile telephones, pagers and personal digital assistance (PDAs), and more particularly, to a visual alarm and signaling system for such devices which incorporates organic electroluminescent materials.

2. Description of the Related Art

In modem modular digital communication devices, such as, mobile telephones, pagers and PDAs, the external appearance and aesthetic design aspects of such devices are becoming increasingly important both from the standpoint of consumer marketing appeal as well as from the user interface point of view. Such devices are now manufactured with various bright colored plastic housings and are often decorated with designs such as flowers to increase their appeal to consumers. Certain designs of cellular telephones, for example, also offer customization features such as flip covers over the display and keypad areas which come in assorted colors as well as with artistic designs on the outer surface. These design features are often very important criteria in a buyer's decision to purchase one model of mobile telephone or pager over another.

Modular digital devices such as mobile telephones and pagers have, however, generally always incorporated the same principal types of alarms and user signaling. These alarms consist of an audible buzz or ring and/or a vibration of the entire unit to allow comparatively confidential signaling of an alarm to a user carrying the module on their person.

Conventional user signaling for a device such as a mobile telephone holds little possibility of customizing the user signaling interface to capitalize upon fashion trends. Moreover, conventional audible signaling systems are of virtually no use to users who are hearing impaired or deaf and are of limited use in very noisy environments.

Thus, a need exists for an alarm and signaling design for a communication device such as a mobile telephone, which can also serve as an eye catching decorative feature of the telephone in keeping with current fashion trends. An alarm and signaling system for a mobile telephone which is strikingly visual, either with or without auditory and vibrating alarms, would also be extremely useful for a user which is hearing impaired or deaf. The system of the present invention incorporates such advantages.

BRIEF SUMMARY OF THE INVENTION

In one aspect the present invention includes a visual alarm system for a modular telecommunication device which has an outer housing in which an upper and lower shell are sealed to one another and formed of a material which is impervious to moisture and oxygen with at least a portion of the upper shell being transparent to light. An organic electroluminescent display assembly is contained within the sealed upper and lower shells and includes a composite layer of electroluminescent material having the characteristic of producing illumination in response to current flow through the material. A first layer of electrically conductive material is positioned on one side of the layer of composite electroluminescent material and comprises a plurality of parallel elongate conductive strips each of which is separate and electrically insulated from the other and connected to an electrical terminal on the outside of the sealed upper and lower shells. A second layer of electrically conductive material is positioned on the other side of the layer of composite electroluminescent material and comprises a plurality of parallel elongate conductive strips each of which is also separate and electrically insulated from the other and extending in a direction at an angle to the conductive stirps in the first layer to define a pixel area within the electroluminescent layer between each crosspoint region between an overlying and underlying conductive strip. Each of the strips in said second layer are also connected to an electrical terminal on the outside of the sealed upper and lower shells. A circuit selectively applies electrical power to the electrical terminals connected to selected ones of the separate strips within the first and second conductive layers to illuminate the pixel areas at the crosspoint regions between each underlying and overlying conductive strip. The circuit is energized in response to the occurrence of an alarm condition within the device to produce illumination of selected ones of the pixel areas underlying the transparent areas in the outer housing and visually signal to a user the existence of the alarm condition.

In a further aspect of the visual alarm system for the modular telecommunication device, the conductive material in one of the first and second layers of conductive material includes indium tin oxide (or another suitable clear conductive material or alloy) and the conductive material in the other layer includes aluminum (or another suitable reflective conductive material or alloy) and the respective longitudinal axes the conductive strips in the two layers extend perpendicular to one another.

BRIEF DESCRIPTION OF THE DRAWINGS

For an understanding of the present invention and for further objects and advantages thereof, reference can now be had to the following description, taken in conjunction with the accompanying drawings in which:

FIG. 1 is a top perspective view of a mobile radio telephone subscriber station constructed in accordance with the principles of the present invention;

FIG. 2 is an end view of the mobile radio telephone subscriber station of FIG. 1 constructed in accordance with the principles of the present invention;

FIG. 3 is an illustrative cross section view showing the construction of a portion of the exterior sidewall of the telephone of FIG. 1 which includes one layer of organic electroluminescent material in accordance with one embodiment of the invention;

FIG. 3a is an illustrative cross section view showing a portion of the construction of the exterior sidewall of the telephone of FIG. 1 which includes three layers of organic electroluminescent materials for full color display generation in accordance with another embodiment of the invention;

FIG. 4 is a an illustrative top view of the conductive control grids for the organic electroluminescent material of FIGS. 3 and 3a which is used in the housing of the cellular radio telephone illustrated in FIG. 1;

FIG. 5 is a diagrammatic cross section view, taken about the lines 5—5 of FIG. 1, showing the various layers of material comprising the organic electroluminescent outer shell of the telephone of FIG. 1;

FIG. 6 is a diagrammatic cross section view, taken about the lines 6—6 of FIG. 1, showing the various layers of material comprising the organic electroluminescent surface of the telephone of FIG. 1;

FIG. 14 is a timing diagram of the sequencing of pixel drivers in an organic electroluminescent display of the type used in the present invention.

DETAILED DESCRIPTION OF THE PREFERRED EMBODIMENT

Figure 7:
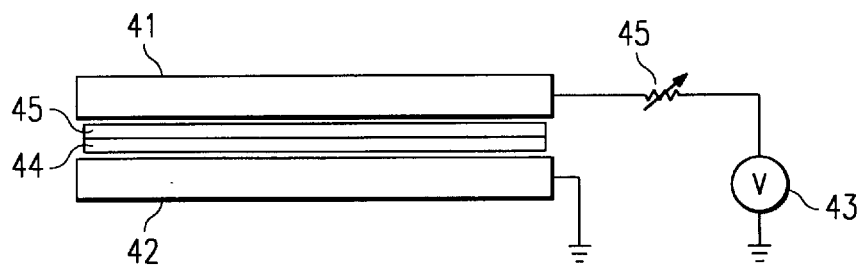
FIG. 7 is a schematic diagram of an illustrative brightness control for an organic electroluminescent layer of the type used in the present invention.

Referring first to FIG. 1, there is shown a top perspective view of an illustrative modular communication device 11, such as mobile radio telephone subscriber station, constructed in accordance with the teachings of the present invention. It should be understood that the housing of the modular device 11 might be adapted for other communication units such as pagers, personal digital assistance (PDAs), laptop computers and the like. As can be seen, the upper surface 12 of the mobile telephone 11 is generally plain and smooth with apertures 13 for allowing sound to emanate from a speaker within the telephone to the ear of a user and apertures 14 for allowing sound from the voice of a user to reach a microphone within the telephone 11. A folding radio transmitting and receiving antenna 15 is also illustrated. As shown in the bottom end view of the telephone 11, the exterior surface 16 of the telephone may be relatively plain and smooth and may incorporate only a simple on/off switch 17 for selectively energizing the circuitry of the telephone. Part or all of the outer shell of the housing of the mobile telephone is composed of organic electroluminescent materials. These materials comprise synthetic monomers and polymers, i.e. plastics, that have the characteristic of producing light when subjected to an electric potential. Organic electroluminescent materials include material referred to as PPV (poly-pphenylene-vinylene) a so-called "conjugated polymer" which emits a yellow-green light when energized. Variants of PPV also have demonstrated emission of red and blue light, respectively. Such organic electroluminescent materials are also referred to as light emitting polymers (LEPS). Another organic electroluminescent material referred to as "Alq" is not a polymer but a hydroxyquinoline-aluminum monomer deposited material available from Kodak of Rochester, N.Y. Examples of organic electroluminescent materials suitable for use in the present invention are available from Electromaterials Corporation of America of Mamaroneck, N.Y.; Amersham International PLC of Buckinghamshire, England; Cambridge Display Technology, Ltd. of Cambridge, England; Eastman Kodak of Rochester, N.Y.; Philips Research Laboratories of Eindhoven, Netherlands; and Pioneer Electronics Corp. of Japan. These different types of materials and assemblies will be referred to herein generically as "electroluminescent materials."

Referring to FIG. 3, there is shown an illustrative cross section view of a segment of an outer shell comprising electroluminescent material of the type described above and employed in the present invention. The top layer 22 of the segment 21 comprises a transparent substrate such as a clear plastic, glass or the like which is impermeable to both moisture and oxygen. Immediately beneath the transparent layer 22 is a layer 23 comprising a plurality of narrow strips of a first translucent electrically conductive material preferably composed of indium tin oxide (ITO) or other such compound. This layer 23 may be formed by taking a solid layer of ITO and then selectively etching away parallel spaced apart strips to leave a series of parallel elongate conductive "wires" separated from one another across the entire area. The bottom conductive layer 24 is preferably also formed of elongate parallel strips of a second suitable electrically conductive material that may be reflective and is preferably composed of aluminum (Al) or other suitable compound. The bottom layer 24 also forms a plurality of parallel, spaced apart conductive strips which are each perpendicular to the strip in the ITO layer 23 and which also act like "wires" and conduct electricity along the surface of the layer 24. Located between the ITO conductive layer 23 and the Al conductive layer 24 are one or more layers of electroluminescent material 25 and 26 such as a LEP or Alq. If an LEP or Alq material is used, a hole transport and electron transport layer may be included on the top and bottom of the LEP or Alq layer, respectively. As mentioned above, these electroluminescent materials, such as PPV or Alq for example, produce a substantially high level of luminescence and emit light 27 in each discreet region which is exposed to a relatively low voltage potential. Thus, a voltage or current across the etched "wires" in layers 23 and 24 would cause light to be produced from the regions of composite layers 25/26 of electroluminescent material which is exposed to that voltage at the crosspoints of the two "wires." The single layer of electroluminescent material 25/26 produces monochromatic light the color of which is determined by the material chosen to form the composite layer.

Referring to FIG. 3a, there is shown an illustrative cross section view of an alternative embodiment of an outer shell of electroluminescent material which includes three separate and independent layers of electroluminescent materials and voltage control layers, rather than only one layer as illustrated in FIG. 3. The materials for each of the three composite electroluminescent layers 25/26 are preferably chosen so that each produces a different "primary color" of light when it is luminescing. Since the voltage control layers 23 and 24 are separately and independently controlled, a full color display can be generated by this embodiment.

Referring next to FIG. 4, there is a top view of an illustrative segment of the electroluminescent material 21 as shown in FIG. 3 wherein it is depicted how the etched wires comprising the ITO layer 23 extend parallel to one another in one direction across the substrate while the etched wires of the Al layer 24 extend parallel to one another in an orthogonal direction to the ITO wires. The point at which an ITO "wire" 23 and an Al "wire" 24 intersect one another forms a "pixel" in that when current flows through each of the two intersecting wires, an electric potential is produced between them which causes the electroluminescent material 25–26 located between the crosspoints and exposed to that voltage potential to produce light. The light 27 exists from the substrate through the transparent layer 22. Thus, a display device including any number of pixels located at a selectively spaced distance from one another can define a display area of desired resolution. Displays may be generated on the surface of the material 21 by selectively energizing particular pixels by pulsing current selectively through the orthogonally intersecting layers of "wires" formed on the upper and lower surfaces on each of the side of the light emitting polymer layers 25–26.

Multicolor displays may be formed by stacking a plurality of the layers of material 21 shown in FIGS. 3, as shown in FIG. 3a, and choosing the particular electroluminescent materials 25–26 used to construct each of the stacked assemblies 21 so that each layer produces a light of a different primary color. By varying the timing of the enablement of each of the pixels and the intensity of the light produced from each of the primary color electroluminescent material layers in, for example a three layer assembly, a full color display made up of generally all colors can be created.

Referring next to FIG. 5, there is shown a partial cross section view taken along lines 5—5 of FIG. 1 of the outer housing of the telephone instrument 11 construction in accordance with the present invention. It can be seen how the outer housing of the telephone can be made of the two half housings which are fitted together to enclose the telephone circuitry. Each half housing comprises an inner lower shell 31 and an outer upper shell 37 which are sealed to one another. Each of the shells 31 and 37 is both moisture and oxygen impermeable. Between the sealed shells 31 and 37 there may be located a touch screen layer 33 constructed in accordance with well known techniques for providing for user input of information by touching a screen with either the user's finger or an instrument. The touch will produce a signal indicative of the specific area on the screen which was touched and thereafter interpreted by circuitry in accordance with the message on the screen overlying the touched area.

Above the touch screen layer 33 there is a conductive surface 34 which is etched or otherwise partially removed to form an array of elongate parallel aluminum (Al), or other suitable material conductive "wires" 24. Above the layer 24 comprising aluminum "wires" are a pair of layers of material 25–26 comprising electroluminescent polymer materials. Immediately above the composite layer 35 of electroluminescent polymers 25–26 is a layer of indium tin oxide (ITO), or other suitable material, conductive materials 36 which has also been etched into a series of parallel strips comprising "wires" 23. As discussed above in connection with FIGS. 3 and 4, each of the "wires" 23 and 24 is connected to a power supply to be selectively driven with electric current by a circuit not shown. Each of the "wires" 24 in the ITO layer 36 is positioned to extend in an orthogonal direction to the "wires" 23 in the aluminum layer 34 and each are connected to a separate driver circuit (not shown) which selectively connects an electric potential to selected ones of the "wires" to illuminate "pixel" areas within the layer 25–26 of organic electroluminescent material at each crosspoint of electrically energized wire in the respective layer 34 or 36 and produce light 27 which exits through transparent shell 37. The upper surface of the array comprising upper outer shell 37 is formed of transparent material which is impermeable to both moisture and oxygen. Sealing of each of the inner and outer shells to one another to form an assembly comprising a half housing is important in an organic electroluminescent device because both moisture and oxygen rapidly degrade the efficiency of the organic electroluminescing material. Such materials must be protected from these substances by being sealed within impermeable bearers. Alternatively, a transparent touch sensitive device 33 might be applied to the upper surface of the outer shell 37 rather than being located within the sealed assembly.

While FIG. 5 only depicts the upper surface and the rounded side surfaces of the telephone instrument 11 as being covered by one or more layers of an organic electroluminescent material, it should also be understood that the entire outer surface of the telephone instrument 11 might be covered with such material. While a touch sensitive surface may not be needed in areas other than areas intended to accept user input, the entire outer surface of the telephone 11 may advantageously be covered with electroluminescent material for reasons further described below.

It should also be understood that while a single composite layer 35 of organic electroluminescent material is indicated, (sandwiched between a layer 34 of aluminum wires 24 on one side and a layer 36 of ETO wires 23 on the other side), multiple composite layers of electroluminescent material each surrounded by control grid-like "wiring" may be provided as illustrated in FIG. 3b. Such multiple composite layer assemblies would then enable a full range of colors to be implemented in an electroluminescent display by selectively energizing different layers which produce light of different primary colors in varying degrees and in varying patterns.

Referring next to FIG. 6, there is shown a longitudinal cross section view taken about lines 6—6 of FIG. 1. As indicated in FIG. 1, the upper surface area 12 of the housing of the telephone 11 may be selectively configured by software, either programmed by the manufacturer or by the user, into one or more discreet areas. For example, there is shown in FIG. 1 a first area 9 which may comprise an alarm area of the telephone and a second area 10 which may comprise a user input/output area for the telephone. As illustrated in more detail in FIG. 5, the entire area on the upper surface comprises an outer shell 37 and an inner shell 31 formed both being formed of an oxygen and moisture impermeable material and sealed together around their periphery. A layer of conductive aluminum grid "wires" 34 and an orthogonal layer of ETO grid "wires" 36 underlie and overlie, respectively, the composite layer of electroluminescent materials 35. The outer impermeable shell 37 is sealed against the lower impermeable shell 32 to ensure that no moisture or oxygen reach the composite layer 35 of electroluminescent materials.

The upper surface 12 of the telephone has been arbitrarily divided into an alarm area 9 and a user input/output area 10. Underlying the alarm area are pixels which have the capability of displaying any alarm message programmed into the software of the system while underlying the user input/output area is a second pixelated area for user output display and the touch sensitive keypad device 33 adapted for responding to user input by touch against the upper surface of the keypad area 10. The electroluminescent upper surface 12 of telephone 11 allows the system to be selectively programmed by software to define the pixilated regions throughout the surface area 12 into various zones or treat the entire surface area as a single zone. One zone can be arbitrarily designated an alarm area, such as 9, and the other arbitrarily defined as a user input-output area 10. Just as the face of a cathode ray tube (CRT) screen can be configured and changed by the software driving the electron guns simultaneously scanning the screen and selectively energizing pixels thereon to cause the screen to produce an image, so also the ITO and Al electric grid(s) can be driven to stimulate the pixels defined by each of the grid cross points above and below the electroluminescent material layers positioned between each of the cross points to produce light at selected locations and thereby, any desired image or message. Moreover, different areas may contain different images or messages during different times. For example, when the telephone is turned on but not being actively used to send or receive communication, the system could be programmed to produce a selected color over the entire exterior surface of the telephone, which, as described above, can be covered by one or more of the composite electroluminescent layer assemblies to produce various colors. Similarly, the system can be programmed by software controlling a circuit for selectively applying electric power to the electroluminescent layer assemblies to generate and display a given visual alarm signal or message either within the alarm area 9 or over the entire exterior surface of the telephone.

The visual alarm system of the present invention incorporates the use of the electroluminescent layer display as a silent alarm to flash a warning to the user by means of either a message or a flashing color, or image. This alarm signal offers a unique method for alerting the user without the noisy sound of a buzzer or ringer. This alarm signal of the present invention is particularly applicable in noisy environments and for the hard of hearing or deaf people who may still want to use the phone or other device for transmitting and receiving short messages. The phone may also be programmed to flash an alarm in a particular color for business calls and in another different color for home or individual calls. With the use of electroluminescent materials molded into the cover of the device such as the telephone 11, the entire outer surface of the telephone instrument housing can flash the silent alarm. This would provide an obvious alert in a striking and unique manner to the user and anyone else who sees the telephone operate. Moreover, such a visual alarm provides a highly useful marketing feature for the telephone. The driving circuitry for a flashing message or image or combination of the two is essentially that shown in and discussed below in connection with FIGS. 7–12. Any of these functions can be combined with audible and/or vibrating alarms for an even more effective alarm. For instance, a textual message in the alarm area 9 can be combined with a flashing color indicating a call from home and so forth. For example, if the outer housing of the telephone programmed to be a solid color while the telephone is in standby mode and the user receives a call, the solid color representing standby mode can be caused by the software to disappear and instead the surface area immediately be caused to flash in a particular attention getting color either in the alarm area 9 or over the entire exterior surface of the telephone. The attention getting color with which the housing is programmed to flash can represent the number or account being called (if the telephone can handle more than one number) or the party from whom the call is being received. Once the user answers the call the exterior of the telephone is visually reconfigured into the keypad and user input/output area 10, described above. In addition, the coloration of background and lettering of a message displayed in the alarm area 9 or the color to be displayed or flashed over the entire outer surface can be selectively programmed by either the manufacturer or the user. Thus, certain colors can be selectively chosen based upon user preference.

Referring next to FIG. 7, there is shown an illustrative schematic diagram of a power supply and control for an electroluminescent device of the type employed in the present invention. A pair of ITO and Al layers 41 and 42 are, respectively, grounded and connected to a voltage source 43 through means for varying the voltage between the electroluminescent layers 44 and 45. By changing the voltage drop across voltage control 46 the degree of color intensity in the light produced by the electroluminescent layers 44 and 45 is varied.

Figure 8:
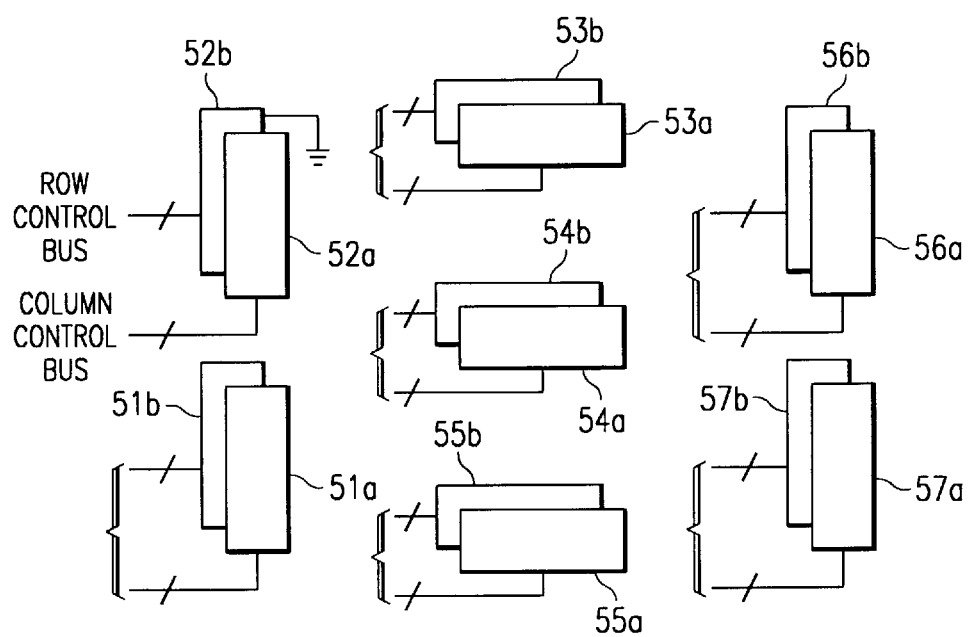
FIG. 8 is a schematic diagram illustrating the control of character segments in organic electroluminescent material layers of the type used in the present invention.

FIG. 8 illustrates an array of electrode pairs comprising elements 51*a–b* charging 57*a–b*. Each of the electrode pairs may comprise the opposed surface areas at the crosspoints of a plurality of elongate orthogonal "wires" of Al and ITO. The area between the two conductive electrodes is filled with a composite layer of electroluminescent material so that upon selective application of a voltage between different ones of the electrode pairs by a power supply, there is created an 7 element character display, for example, to selectively display the numbers 0–9. Each of the elements 51*a*–57*a* is connected, respectively, to a row control bus driver lead from a power supply (not shown) while each of the elements 51*b*–57*b* is connected, respectively, to a column control bus driver lead. It should be noted that most conventional drive schemes and circuits used in conventional LCD type displays can be utilized on organic electroluminescent displays or backlights.

Figure 9:
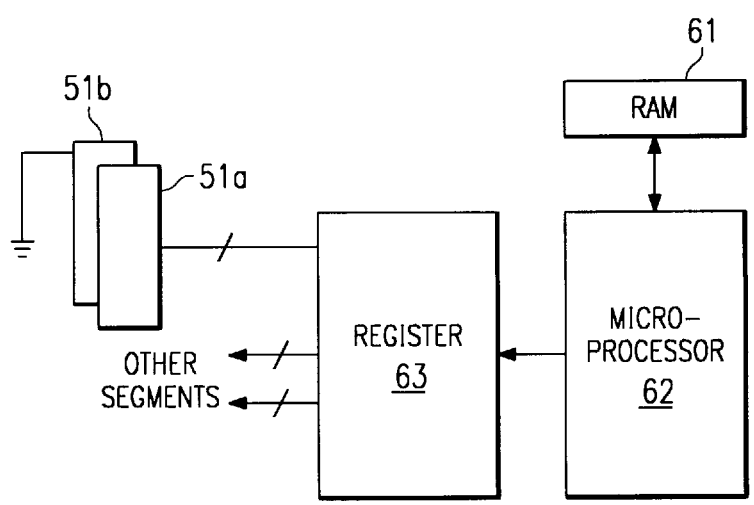
FIG. 9 is a block diagram of the control circuitry for a segmented character display.

Referring to FIG. 9, there is shown a column/row drive circuit for one of each of the pair of the elemental segments shown in FIG. 8. A random access memory 61 is connected to a microprocessor 62 which drives a register 63. The output of the register 63 is connected to a plurality of the elements, for example segment 51*a*, as well as additional elements. Upon selective energization of the register by the microprocessor under control of control software stored in RAM memory, a sequence of elements are energized to create a changing display in a color defined by the composition of the electroluminescent material between the elements.

Figure 10:
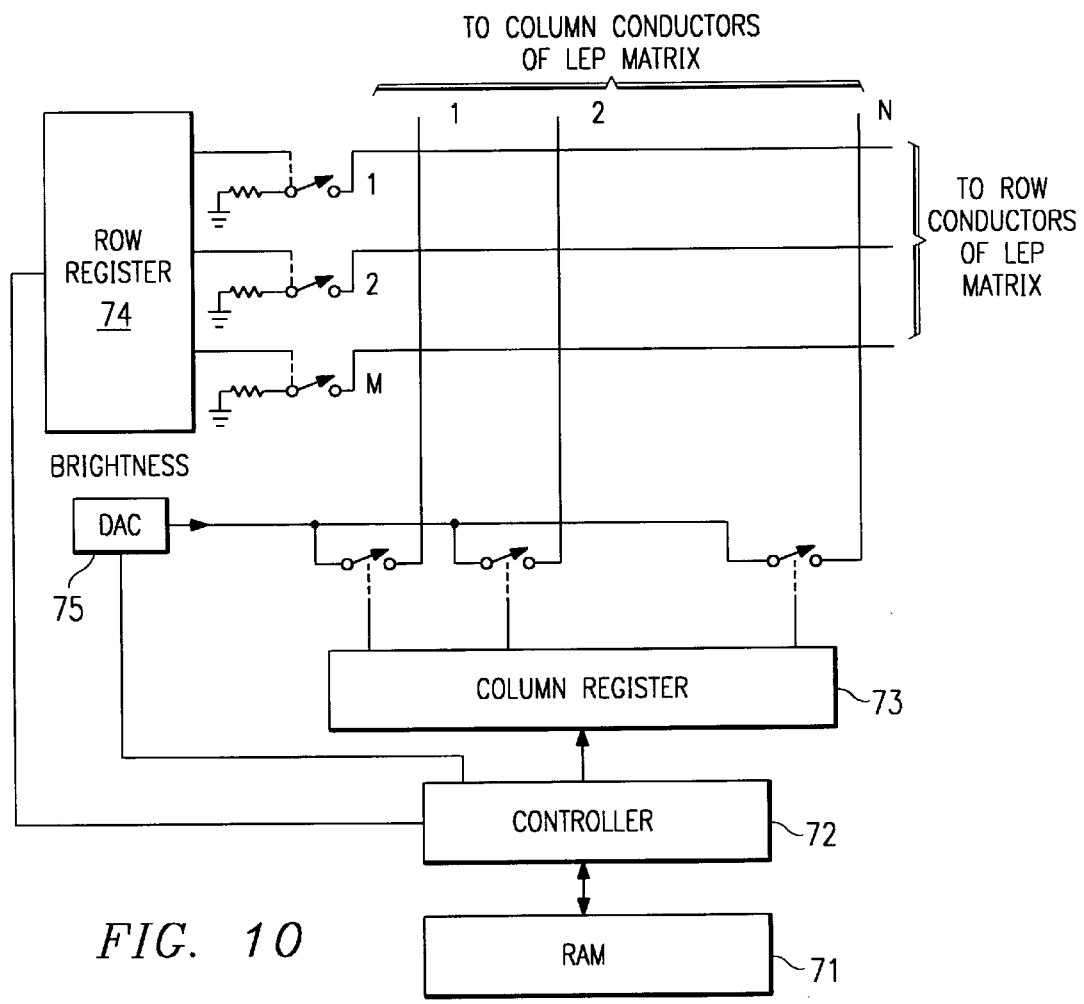
FIG. 10 is a schematic diagram of the control circuitry for a monochromatic graphics display incorporating an organic electroluminescent material display of the type used in the present invention.

Referring next to FIG. 10, there is shown a circuit for controlling a full monochrome graphic display. A random access memory 71 is connected through a controller 72 which selectively drives a column register 73 and a row register 74. A digital/analog converter 75 controls the amount of power to be delivered to the rows and columns of the orthogonal "wires" by the circuit. The row register controls, for example, the voltage on the plated "wires" in one of the orthogonal directions 76 of the electroluminescent display (FIG. 4) while the column register 73 controls the voltage to be applied to the plated "wire" in the other orthogonal direction 77 of the electroluminescent display (FIG. 4). Thus, pixels on a grid-like array such as that illustrated comprising the front surface 12 of the telephone 11 in FIG. 1, may be selectively controlled by software contained within the RAM 71 to selectively generate either a solid color or an image design or pattern as desired on that surface. The circuitry of FIG. 10 is for the control of a single color of electroluminescent material.

Figure 11:
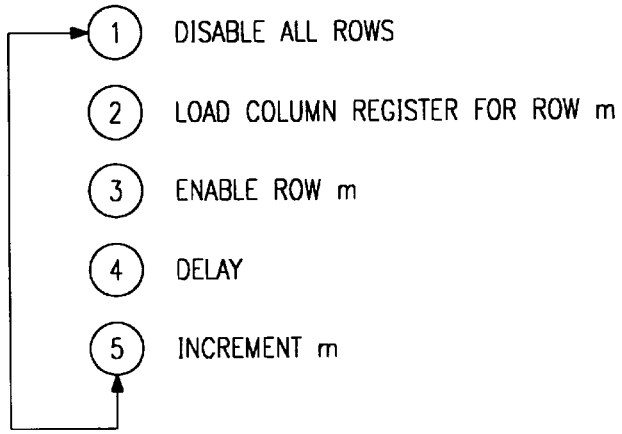
FIG. 11 is a sequence diagram illustrating the control of an organic electroluminescent display by the circuit of FIG. 10.

Referring next to FIG. 11, a sequence chart illustrating the sequence of operation of the circuit of FIG. 10 is depicted. In step 1, all rows are disabled followed by step 2 where the row register is loaded for one of the rows, e.g. row M. In step 3, the system enables row M by applying voltage to it and at step 4 a delay is implemented. Finally, at step 5 the system increments M and moves back to 1 to disable all rows and cycle through again. The column leads are controlled in a similar fashion. The cyclic operation of such rows and columns are controlled by software to produce the desired display.

Figures 12, 13:
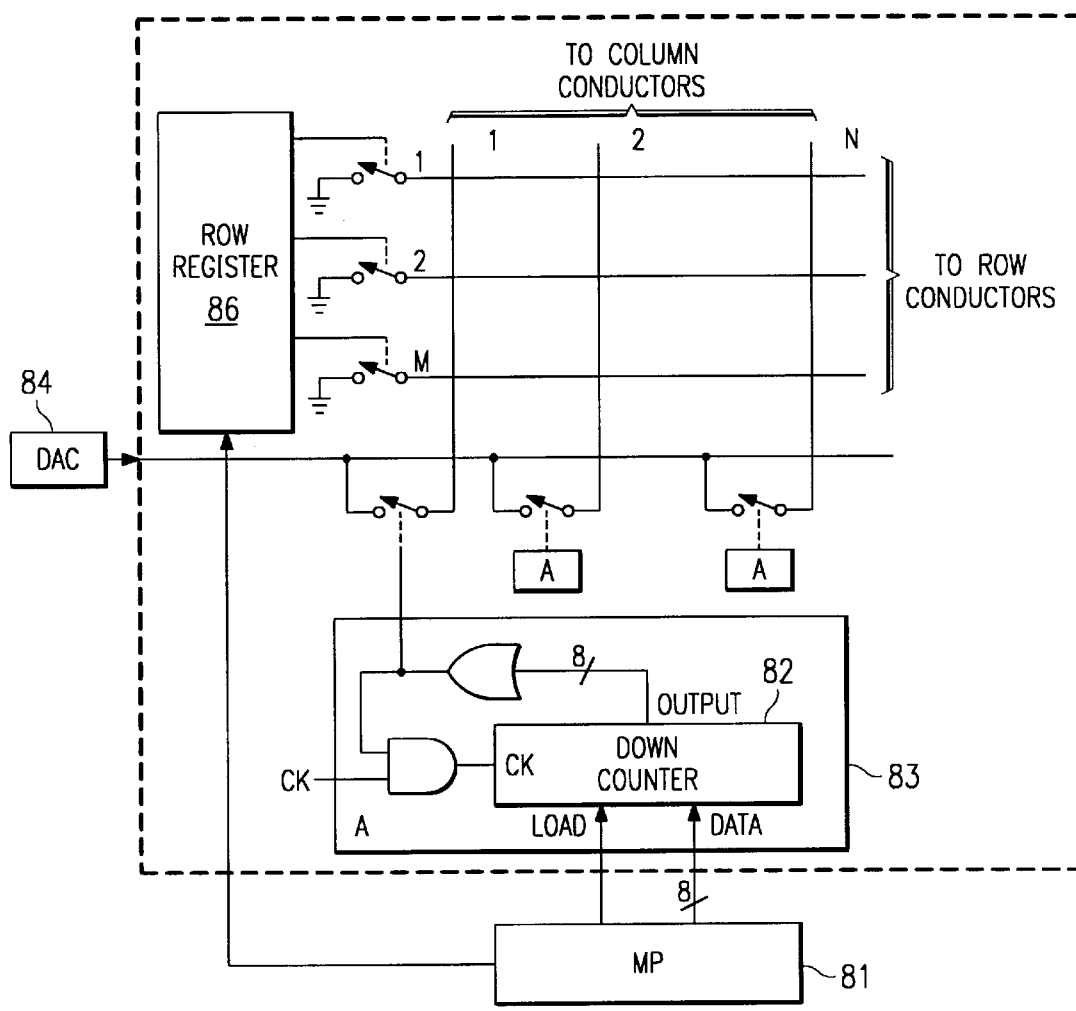
FIG. 12 is a block diagram of the circuitry for the control of a full color graphics organic electroluminescent display of the type used in the present invention.
FIG. 13 is a sequence diagram illustrating the control of an organic electroluminescent display of the type used in the present invention by the circuit of FIG. 12.

Referring next to FIG. 12, there is shown an illustrative circuit diagram for a driving circuit for an electroluminescent display of the type employed in the present invention which implements a full display color. In FIG. 12, a microprocessor 81 controls the down counter 82 within a column register 83. A digital/analog converter 84 controls the intensity of each color. The column register 83 controls one direction while a row register 86 controls the other orthogonal direction. There is a duplicate circuitry of FIG. 12 for each color so that full enablement of full color graphics is possible if the colors in each layer of electroluminescent material are chosen, for example, to be primary colors, respectively.

Referring briefly to FIG. 13, there is shown a sequence chart depicting the operation of FIG. 12. In Step 1, all rows are turned off and the system moves to step 2 at which the circuit is disabled. At 3, the system downloads the counter column 1 for row M, at 4 downloads the counter column 2 for row M and so forth through column N for row M to sequence through the pattern.

In FIG. 14, there is depicted a timing diagram illustrating the driver output for different levels of illumination of a pixel. For example, in pattern "a" there is no voltage and therefor the pixel is unlit. In pattern "b" there is a relatively short pulse which creates a dim pixel while in pattern "c" the pixel is driven for a considerable period of time thus producing a brighter pixel. The display given is for a time slot for one row.

By way of general summary, the basic principles of operation of the electroluminescent display incorporated into the alarm and signaling system of the present invention are related to those used in liquid crystal displays (LCDs). An electroluminescent layer such as a light emitting polymer layer or layers (LEPs) or Alq layer (with hole or electron transport layers) are sandwiched between two conductive layers comprising Indium Tin Oxide (ITO) and Aluminum (Al) that are etched, usually via a laser or other means, into conductive elongate conductive strips comprising "wires." Each of the etched "wires" on these respective areas run perpendicular to one another. At the crossing point of the "wires" between the top ITO layer and the bottom Al layer, a pixel is formed. A particular pixel is lighted by voltage when the appropriate ITO "wire" and the corresponding "Al" are combined in a circuit. The current going through the crosspoint between the two wires excites the organic electroluminescent layer and light is emitted. In current technology, electroluminescent materials, such as LEP and Alq have been developed that exhibit the colors green, yellow, blue, and red and orange. The green/yellow and/or orange LEP's and Alq's have proven to be the most efficient color so far. The light emitting electroluminescent material display operates at a relatively low voltage and a reasonable current and give light levels that are comparable to both light emitting diode (LEDs) and liquid crystal displays (LCDs).

Although preferred embodiments of the method and apparatus of the present invention have been illustrated in the accompanying drawings and described in the foregoing description, it is understood that the invention is not limited to the embodiment(s) disclosed but it capable of numerous rearrangements, modifications and substitutions without departing from the spirit of the invention as set forth and defined in the following claims.

What is claimed is:

1. A visual alarm system for a modular telecommunication device comprising:

an outer housing for said modular telecommunications device which includes an upper and lower shell sealed to one another and formed of a material which is impervious to moisture and oxygen with at least a portion of said upper shell being transparent to light;

an organic electroluminescent display assembly contained within said sealed upper and lower shells which includes, a composite layer of organic electroluminescent material having the characteristic of producing illumination in response to voltage across the material;

a first layer of electrically conductive material on one side of said layer of composite organic electroluminescent material, said first layer comprising a plurality of parallel elongate conductive strips separated from one another and connected to an electrical terminal on the outside of said sealed upper and lower shells;

a second layer of electrically conductive material on the other side of said layer of composite organic electroluminescent material from said first layer, said second layer comprising a plurality of parallel elongate conductive strips separated from one another and extending in a direction at an angle to the conductive strips in said first layer to define a pixel area within the organic electroluminescent layer between each crosspoint region between an overlying and underlying conductive strip, each of said strips in said second layer also being connected to an electrical terminal on the outside of said sealed upper and lower shells;

a circuit for selectively applying electrical power to the electrical terminals connected to selected ones of said separate strips within said first and second conductive layers to illuminate said pixel areas at the crosspoint regions between each underlying and overlying conductive strip to which electrical power is selective applied and allow said illuminated pixels to be visible through portions of said upper and lower shell which are transparent; and means for energizing said circuit in response to the occurrence of an alarm condition within said modular telecommunications device to produce illumination of selected ones of the pixel areas underlying the transparent areas in said outer housing and visually signal to a user the existence of said alarm condition.

2. A visual alarm system for a modular telecommunication device as set forth in claim 1 wherein the conductive material in one of said first and second layers of conductive material includes a material of indium tin oxide and the conductive material in the other layer includes a material of aluminum.

3. A visual alarm system for a modular telecommunication device as set forth in claim 1 wherein s aid plurality of strips in said first layer of conductive material extend in a direction orthogonal to said plurality of strips in said second layer of conductive material.

4. A visual alarm system for a modular telecommunication device as set forth in claim 1 wherein said composite layer of organic electroluminescent material having the characteristic of producing illumination in response to voltage across the material includes at least two separate layers of a light emitting polymer material of poly-phenylene-vinylene or Alq type monomers.

5. A visual alarm system for a modular telecommunication device as set forth in claim 1 wherein said sealed upper and lower shells also includes at least a second complete and separate organic electroluminescent display assembly and also includes:

an area of said first display assembly underlying at least a portion of said outer shell which is transparent to light to define a standby mode indicating visual condition on the outer housing;

an area of said second display assembly underlying at least a portion of said outer shell which is transparent to light to define an alarm condition indicating visual display on the outer housing; and wherein said circuit for selectively applying electrical power to the electrical terminals is connected to selected ones of said separate strips within both said first and second conductive layers of said first organic electroluminescent display assembly and first and second organic electroluminescent display and is selectively operative in either one of two modes, a first mode in which it is operative and controlled in a manner that illuminates selected pixels in the organic electroluminescent layer of the second display assembly at the crosspoints between each of the underlying and overlying conductive strips in said decorative display region to provide standby mode indicating display on the surface of said modular telecommunications device and, alternatively, in a second mode in which it is operative and controlled in a manner that illuminates selected pixels in the organic electroluminescent layer of the first display assembly at the crosspoints between each of the underlying and overlying conductive strips to provide said visible alarm condition indicating to a user the presence of said alarm condition within said modular telecommunications device.

6. A visual alarm system for a modular telecommunication device as set forth in claim 1 wherein said sealed upper and lower shells are substantially entirely transparent to light, said organic electroluminescent display assembly contained within said sealed upper and lower shells underlies substantially all of the transparent portions of said shells and said circuit for selectively applying electrical terminals is controlled to provide a substantially uniform color to the exterior of said modular telecommunication device.

7. A visual alarm system for a modular telecommunication device as set forth in claim 1 wherein said energizing means is selective operable in at least two separate conditions, the first condition producing illumination of selected ones of the pixels areas underlying the transparent areas in said outer housing to visually signal to a user the existence of a standby condition within said telecommunication device and the second condition producing illumination of selected ones of the pixels areas underlying the transparent areas in said outer housing to visually signal to a user the existence of said alarm condition within said telecommunication device.

8. A visual alarm system for a modular telecommunication device as set forth in claim 7 wherein said producing illumination of selected ones of the pixels areas in said outer housing to visually transparent areas in said outer housing to visually signal to a user the existence of said alarm condition within said telecommunication device further have at least two separate visual states, one to indicate an alarm comprising an incoming call of a first type and another to indicate an alarm comprising an incoming call of a second type.

9. A visual alarm system for a modular telecommunication device as set forth in claim 1 wherein said organic electroluminescent display assembly contained within said sealed upper and lower shells underlying said transparent area defines an alarm region and a user input/output region and where said user input/output region also includes:

a touch sensitive screen underlying said at least a portion of said user input/output region, said screen having electrical connections passing through said sealed upper and lower shells for connection to external circuitry for receiving input signals from a user.

10. A visual alarm system for a modular telecommunication device as set forth in claim 9 wherein said circuit for selectively applying electrical power to the electrical terminals connected to selected ones of said separate strips with said first and second conductive layers is controlled in a manner that illuminates selected pixels in the organic electroluminescent layer at the crosspoints between each of the underlying and overlying conductive strips in said user input region defined by said touch sensitive screen to provide visible guidance to a user as to where to touch said screen in order to enter a desired input into the said modular telecommunications device.

11. A visual alarm system for a modular telecommunication device as set forth in claim 9 wherein said organic electroluminescent display assembly contained within said sealed upper and lower shells and underlying said user input/output regions also includes:

an area of said display assembly underlying at least a portion of said outer shell which is transparent to light to define a user display region, and wherein said circuit for selectively applying electrical power to the electrical terminals connected to selected one of said separate strips within said first and second conductive layers is controlled in a manner that illuminates selected pixels in the organic electroluminescent layer at the crosspoints between each of the underlying and overlying conductive strips in said user display region underlying said transparent portion of said upper shell to provide visible messages to a user related to operation of said modular telecommunications device.

* * * * *

UNITED STATES PATENT AND TRADEMARK OFFICE
CERTIFICATE OF CORRECTION

PATENT NO. : 5,877,695
DATED : Mar. 2, 1999
INVENTOR(S) : Kubes et al.

It is certified that error appears in the above-identified patent and that said Letters Patent is hereby corrected as shown below:

| | |
|---|---|
| Column 1, line 22 | Replace "modem" With --modern-- |
| Column 3, line 62 | Replace "(poly-pphenylene-vinylene)" With --(poly-p-phenylene-vinylene)-- |
| Column 5, line 50 | Replace "material" With --material,-- |
| Column 10, line 60 | Replace "s aid" Insert --said-- |
| Column 11, line 21 | Replace "second" With --second conductive layers of said second-- |
| Column 11, line 45 | Replace "electrical" With --electrical power to the electrical-- |
| Column 12, line 28 | Replace "with" With --within-- |

UNITED STATES PATENT AND TRADEMARK OFFICE
CERTIFICATE OF CORRECTION

PATENT NO. : 5,877,695
DATED : Mar. 2, 1999
INVENTOR(S) : Kubes et al.

It is certified that error appears in the above-identified patent and that said Letters Patent is hereby corrected as shown below:

Column 11, line 45    Replace "electrical"
                      With --electrical power to the electrical--

Column 12, line 28    Replace "with"
                      With --within--

Signed and Sealed this

Twenty-fourth Day of August, 1999

Attest:

Q. TODD DICKINSON

*Attesting Officer*    *Acting Commissioner of Patents and Trademarks*